(12) United States Patent
Babbar et al.

(10) Patent No.: US 7,688,792 B2
(45) Date of Patent: Mar. 30, 2010

(54) METHOD AND APPARATUS FOR SUPPORTING WIRELESS DATA SERVICES ON A TE2 DEVICE USING AN IP-BASED INTERFACE

(75) Inventors: Uppinder Singh Babbar, San Diego, CA (US); Marcello Lioy, San Diego, CA (US); Nischal Abrol, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 641 days.

(21) Appl. No.: 11/112,484

(22) Filed: Apr. 21, 2005

(65) Prior Publication Data

US 2006/0239266 A1    Oct. 26, 2006

(51) Int. Cl.
H04W 4/00    (2009.01)
H04W 72/00    (2006.01)

(52) U.S. Cl. .................. 370/338; 370/310; 370/342; 709/223; 455/414.1; 455/450; 455/556.1

(58) Field of Classification Search ......... 370/350–430, 370/310, 315, 342, 338; 709/223–229; 455/556.2, 455/414.1, 450–452.2, 556, 1
See application file for complete search history.

(56) References Cited

U.S. PATENT DOCUMENTS 6,483,822 B1 * 11/2002 Lioy et al. .................. 370/329
6,600,930 B1 * 7/2003 Sakurai et al. ........... 455/414.3
2003/0174714 A1    9/2003 Manik et al.
2004/0240449 A1 * 12/2004 Su .......................... 370/395.2
2005/0286476 A1 * 12/2005 Crosswy et al. ............. 370/338

FOREIGN PATENT DOCUMENTS

| KR | 2003-94724 | 12/2003 |
|---|---|---|
| KR | 2004-28076 | 4/2004 |
| WO | 03075517 A2 | 9/2003 |

OTHER PUBLICATIONS internationai Search Report PCT/US2006/015254 internatonai Search Authority European Patent Office, Dec. 8, 2006.
Written Opinion PCT/US2006/015254, International Search Authority European Patent Office Oct. 21, 2007.

* cited by examiner

*Primary Examiner*—Lester Kincaid
*Assistant Examiner*—Daniel Lai
(74) *Attorney, Agent, or Firm*—Kupong M. Nacek; Kristine U. Ekwueme

(57) ABSTRACT

A wireless network assigns a single IP address to the wireless device, which assigns this IP address over to a TE2 device coupled to the wireless device. The wireless device derives a private IP address for communication with the TE2 device. The wireless device forwards packets exchanged between the TE2 device and the wireless network using the single IP address. The wireless device exchanges packets with the TE2 device by (1) using the private IP address for outbound packets sent to the TE2 device and (2) performing either address-based routing or packet filtering on inbound packets received from the TE2 device. The wireless device exchanges packets with the wireless network by (1) using the single IP address for outbound packets sent to the wireless network and (2) performing packet filtering on inbound packets received from the wireless network.

38 Claims, 10 Drawing Sheets

METHOD AND APPARATUS FOR SUPPORTING WIRELESS DATA SERVICES ON A TE2 DEVICE USING AN IP-BASED INTERFACE

BACKGROUND

1. Field

The present invention relates generally to data communication, and more specifically to a method and apparatus for supporting wireless data services on a TE2 device.

2. Background

Wireless communication networks are widely deployed to provide various communication services such as voice, packet data, and so on. With advancements in wireless data technology, wireless networks and wireless devices are capable of supporting a multitude of wireless data services. Examples of such wireless data services include geographic position-based services, multimedia streaming and broadcast services, Short Message Service (SMS) and text messaging services, and so on. The spectrum of wireless data services and their capabilities are expanding rapidly, and new data applications are continually being developed to make use of these services.

A wireless device may be coupled to a TE2 device and used to provide or support wireless data services for the TE2 device. The wireless device may be a cellular phone, a user terminal, a data card, or some other device that is capable of providing access to a wireless data network. The TE2 device may be a laptop computer, a personal digital assistant (PDA), or some other computing device. The terms "TE2 device" and "terminal equipment" are synonymous and used interchangeably. The wireless device may be coupled to the TE2 device in various manners such as, e.g., as an embedded card, a PCM-CIA removable card, a tethered mode phone, and so on. The TE2 device may communicate with the wireless device using various hardware and/or software interconnections. In any case, the TE2 device uses the wireless device to gain access to the wireless data network for general Internet access and/or for other forms of data connectivity.

Many wireless data services are based on wireless device-centric designs. For these designs, the wireless data services are only accessible to the wireless device itself or are readily available to the wireless device. Furthermore, the wireless data services are often available using proprietary methodologies that are designed for specific wireless data network technologies such as Code Division Multiple Access (CDMA), Universal Mobile Telecommunications System (UMTS), General Packet Radio Service (GPRS), Evolution Data Only (EVDO), and so on. The TE2 device typically communicates with, and relies upon, the wireless device to gain access to the wireless data services.

It is highly desirable for the TE2 device to be able to access the wide multitude of wireless data services that are available on the wireless device. This is beneficial for several reasons. First, a mobile user may only be able to access wireless data services if these services are available on the TE2 device. For example, the wireless device may be embedded in the TE2 device (e.g., in the form of a data card) and can no longer be used as a standalone device (such as a cellular phone). The TE2 device (and not the wireless device) would then provide a user interface to the mobile user and the wireless data services would need to be accessible via the TE2 device. Second, having the same wireless data services available on both the TE2 device and the wireless device would allow end applications to more fully utilize the available wireless data services.

There is therefore a need in the art for a method and apparatus for supporting wireless data services on a TE2 device.

SUMMARY

Techniques for supporting wireless data services and data connectivity on a TE2 device coupled to a wireless device using an Internet Protocol (IP)-based interface are described herein. The wireless device is typically assigned a single IP address by a wireless network. The wireless device configures a Um interface within the wireless device with this single IP address and also assigns this single IP address over to the TE2 device. The Um interface is used to communicate with the wireless network. The TE2 device uses the single IP address to obtain data/IP connectivity from the wireless network. The wireless device derives a private IP address for its use to communicate with the TE2 device and configures an Rm interface within the wireless device with this private IP address. The Rm interface is used to communicate with the TE2 device. The wireless device may communicate with the wireless network using an IP-based interface by installing IP packet filters on the Um interface. The wireless device may communicate with the TE2 device using an IP-based interface by installing IP packet filters on the Rm interface or using some other mechanism.

Thereafter, the wireless device forwards packets exchanged between the TE2 device and the wireless network using the single IP address. These packets are not intended for the wireless device since they do not match any of the IP packet filters installed on the Um and/or Rm interface. The wireless device may exchange data with the TE2 device via the Rm interface by (1) using the private IP address as the source address for outbound packets sent to the TE2 device and (2) performing either address-based routing or packet filtering on inbound packets received from the TE2 device. The wireless device may also exchange data with the wireless network via the Um interface by (1) using the single IP address as the source address for outbound packets sent to the wireless network and (2) performing packet filtering on inbound packets received from the wireless network.

The wireless device may also implement various application servers to support wireless data services on the TE2 device, as described below. Various aspects and embodiments of the invention are also described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
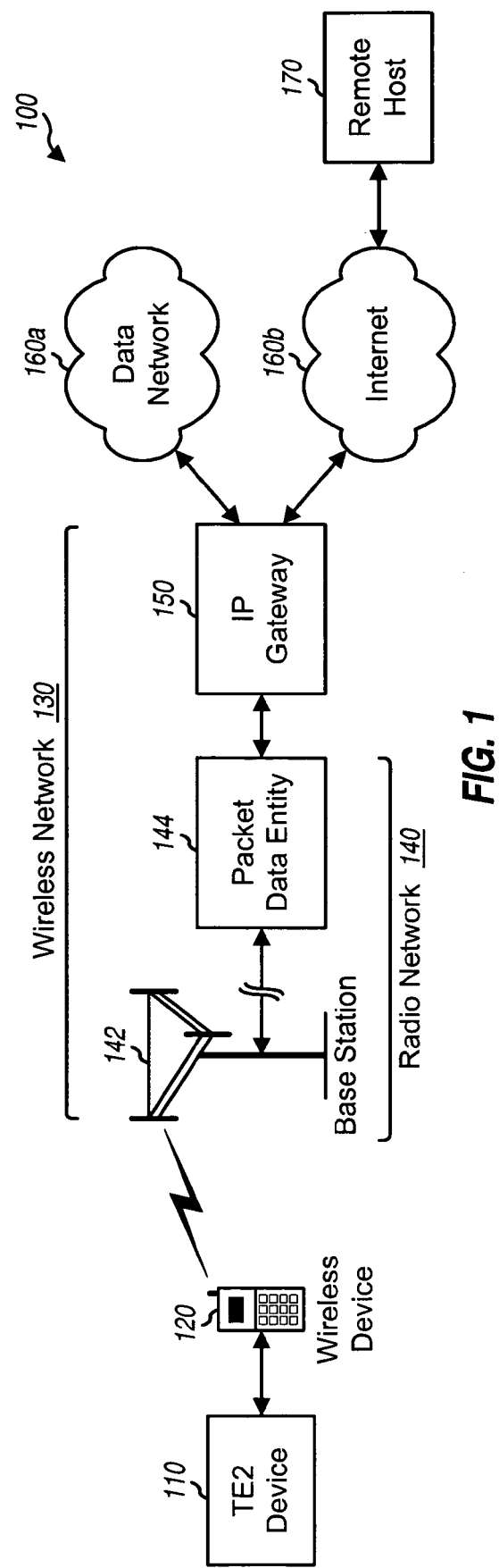
FIG. 1 shows an exemplary wireless deployment.

FIG. 1 shows a deployment 100 in which a wireless device 120 communicates with a wireless network 130 to obtain wireless data services. Wireless device 120 may also be called a mobile station (MS), a user equipment (UE), a user terminal, a subscriber unit, or some other terminology. Wireless network 130 includes a base station 142, a packet data entity 144, and an IP gateway 150. Base station 142 provides radio communication for wireless device 120. Packet data entity 144 controls the transmission of packets between base station 142 and IP gateway 150. IP gateway 150 supports data services for the wireless devices in wireless network 130. For example, IP gateway 150 may be responsible for the establishment, maintenance, and termination of PPP (Point-to-Point Protocol) sessions for the wireless devices and may further assign dynamic IP addresses to the wireless devices. IP gateway 150 may couple to a data network 160a, the Internet 160b, and/or other data networks. IP gateway 150 can communicate with various entities (e.g., a remote host 170) that couple to these data networks.

Wireless network 130 may also be viewed as being composed of a radio network 140 and a packet data network. Radio network 140 includes base station 142 and packet data entity 144 and supports radio communication. The packet data network includes IP gateway 150 and supports packet-switched communication between radio network 140 and external data networks.

Wireless network 130 may be a CDMA network, in which case packet data entity 144 is called a Packet Control Function (PCF) and IP gateway 150 is called a Packet Data Serving Node (PDSN). Wireless network 130 may also be a UMTS network, in which case packet data entity 144 is called a Serving GPRS Support Node (SGSN) and IP gateway 150 is called a Gateway GPRS Support Node (GGSN). Wireless network 130 may also be a wireless local area network (WLAN) that provides communication coverage for a limited geographic area. For example, wireless network 130 may be an IEEE 802.11 network or a Bluetooth personal area network (BT-PAN). In general, wireless network 130 may be a wireless wide area network (WWAN) (e.g., a CDMA or UMTS network) or a WLAN (e.g., an IEEE 802.11 network or a BT-PAN).

Wireless device 120 may be coupled to a TE2 device 110 via a wireline connection (as shown in FIG. 1) or a wireless connection. The wireline connection may be via a serial bus such as a Universal Serial Bus (USB), an RS232/EIA232 interface, a Personal Computer Memory Card International Association (PCMCIA) interface, an IEEE-1394 bus, a Peripheral Component Interconnect (PCI) bus, shared memory, Inter-Process Communication (IPC) such as message queues and events, and so on. The wireless connection may be via IEEE 802.11, Bluetooth, and so on.

In the "attached" configuration, with TE2 device 110 coupled to wireless device 120, a mobile user can obtain various services (e.g., IP connectivity and/or wireless data services) via TE2 device 110. To obtain these services, TE2 device 110 communicates with wireless device 120, which further communicates with wireless network 130. Wireless device 120 provides radio communication to obtain the desired services, and TE2 device 110 supports end-to-end communication for the desired services.

Figure 2:
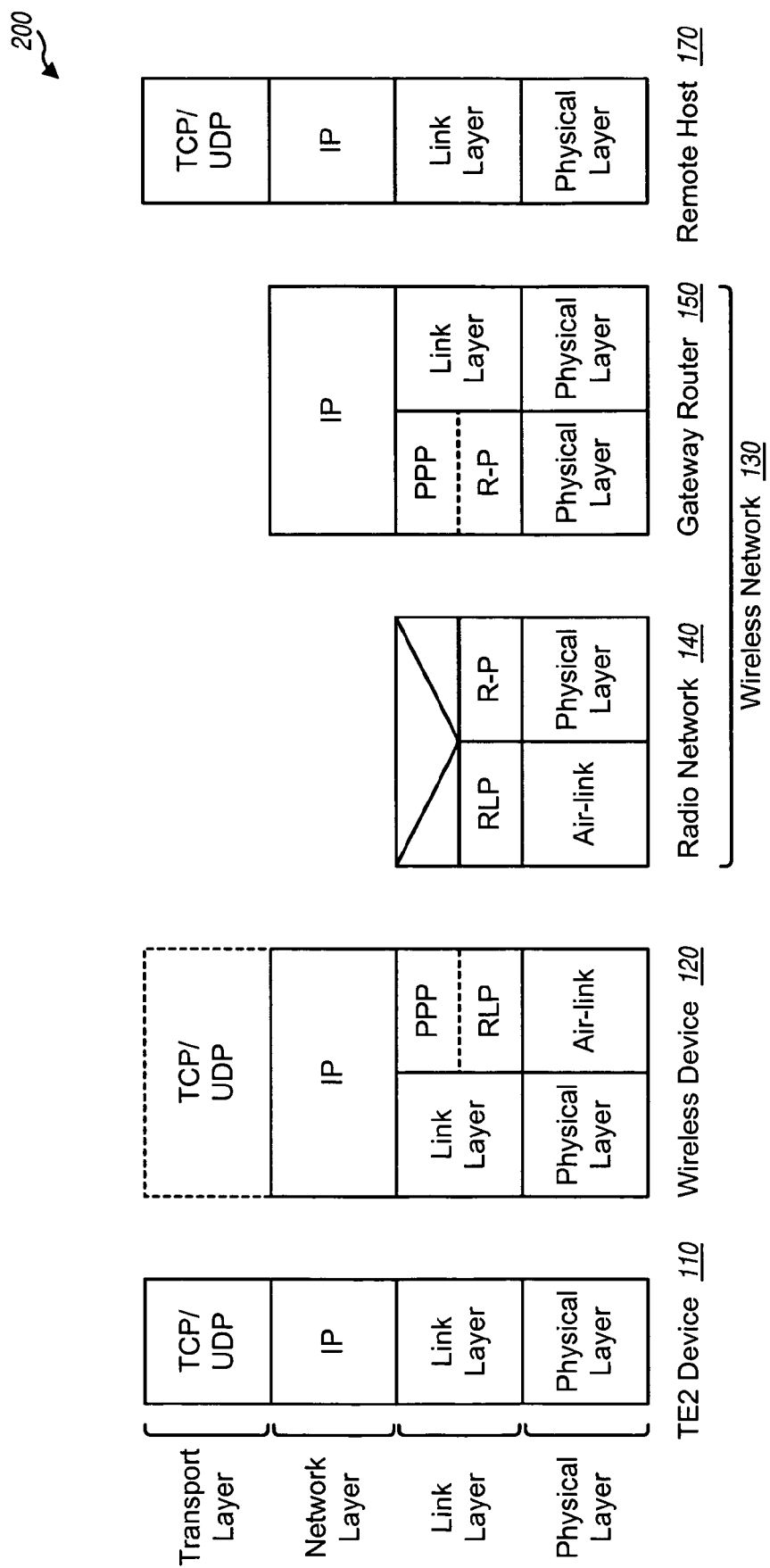
FIG. 2 shows an exemplary protocol stack.

FIG. 2 shows an exemplary protocol stack 200 for data communication between TE2 device 110 and remote host 170, via wireless device 120 and wireless network 130. The protocol stack includes a transport layer, a network layer, a link layer, and a physical layer.

TE2 device 110 and remote host 170 may communicate using Transmission Control Protocol (TCP), User Datagram Protocol (UDP), or some other protocol at the transport layer. TCP and UDP typically operate on top of Internet Protocol (IP) at the network layer. Transport layer data (e.g., for TCP and/or UDP) is encapsulated in IP packets, which are exchanged between TE2 device 110 and remote host 170 via wireless device 120, radio network 140, and IP gateway 150.

The link layer between TE2 device 110 and wireless device 120 may be Ethernet or some other protocol. The link layer between wireless device 120 and wireless network 130 is typically dependent on the wireless network technology. For a CDMA network, the link layer is implemented with PPP over a Radio Link Protocol (RLP). Wireless device 120 maintains a PPP session with IP gateway 150 for the data session and communicates with radio network 140 via RLP for data exchanges. RLP operates on top of an air-link interface (e.g., IS-2000 or IS-856). Radio network 140 communicates with IP gateway 150 via a technology-dependent interface (e.g., an "R-P" interface for a CDMA network) that operates on top of a physical layer. IP gateway 150 communicates with remote host 170 via IP over a link layer and a physical layer.

Figure 3:
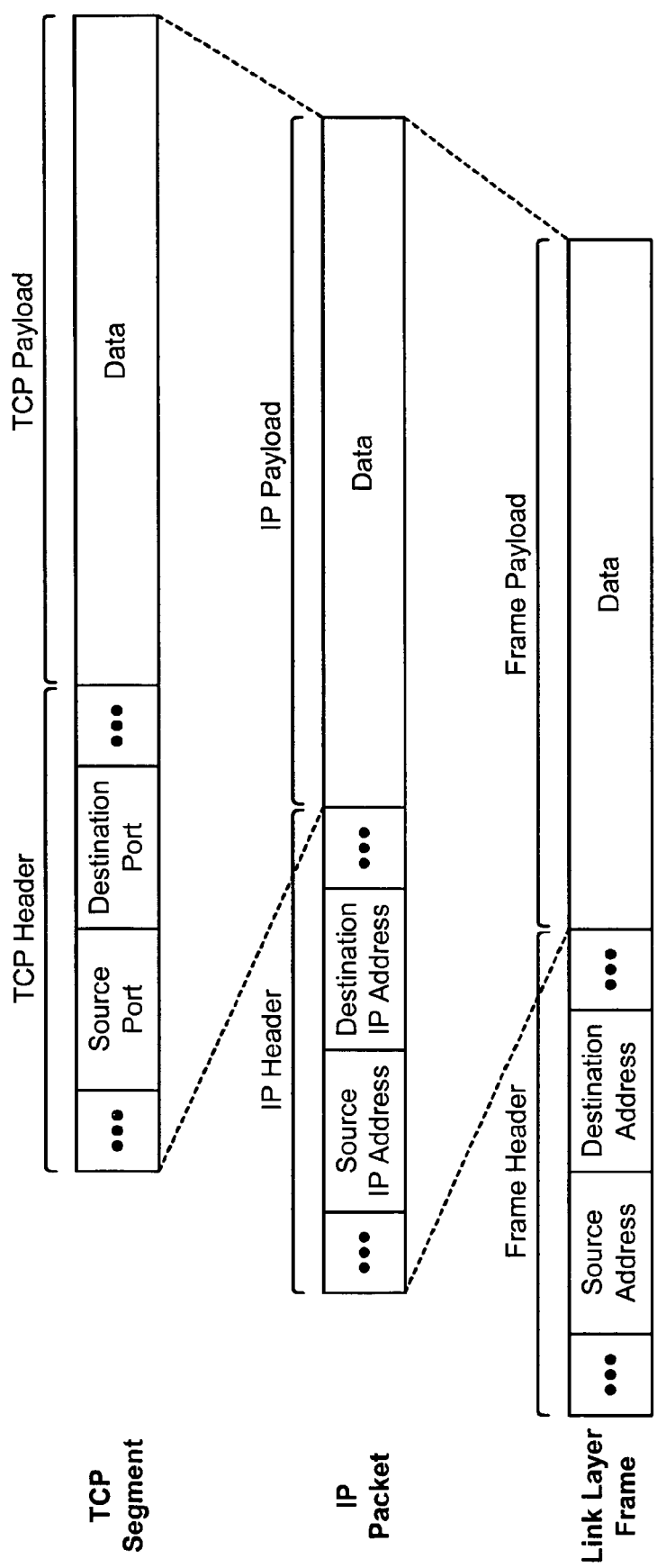
FIG. 3 shows data encapsulation for the transport, network, and link layers.

FIG. 3 shows the formats and the encapsulation of data units for the transport, network, and link layers. For TCP at the transport layer, data is sent as TCP segments, with each segment including a TCP header and a TCP payload. The TCP header includes a source port and a destination port, where a port indicates a logical channel associated with the data in the payload. For IP at the network layer, data is sent as IP packets (or datagrams), with each IP packet including an IP header and an IP payload. The IP header includes a source IP address and a destination IP address for a source node and a destination node, respectively, for the IP packet. The IP payload may carry a TCP segment or some other data. The IP packets are encapsulated in link layer (e.g., Ethernet) frames. Each link layer frame typically includes a header (e.g., with the source and destination addresses) and a payload for network layer data.

Figure 4:
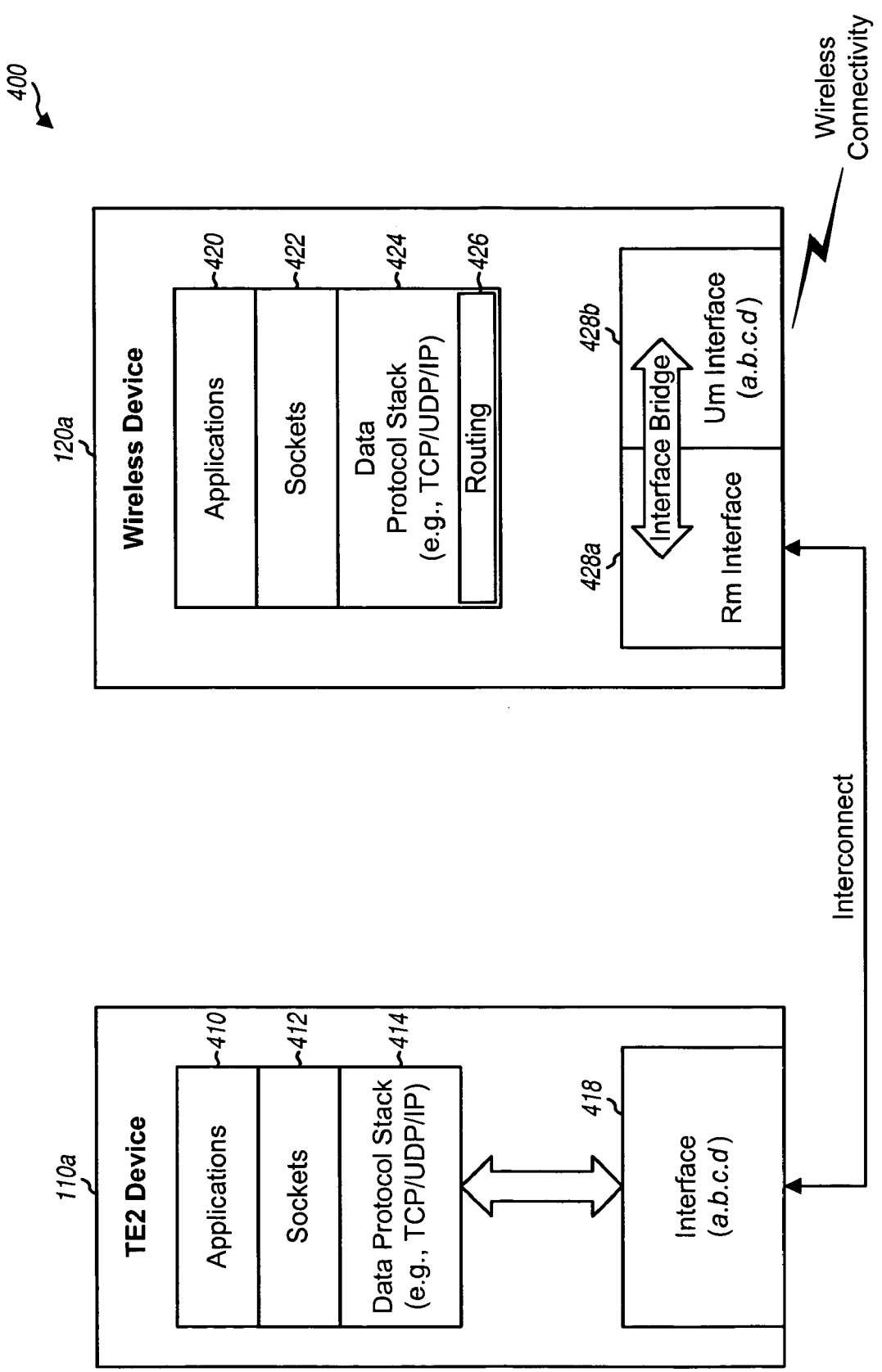
FIG. 4 shows a configuration for providing data/IP connectivity to a TE2 device via a wireless device.

FIG. 4 shows a configuration 400 for providing data/IP connectivity to a TE2 device 110a via a wireless device 120a, which are one embodiment of TE2 device 110 and wireless device 120, respectively, in FIG. 1. At TE2 device 110a, applications 410 and sockets 412 execute over a data protocol stack 414. A socket is one endpoint of a two-way communication path between two applications running on a network and is bound to a port number so that transport layer protocols such as TCP can identify the application for data to be sent. TE2 device 110a communicates with wireless device 120a via an interface 418. At wireless device 120a, applications 420 and sockets 422 execute over a data protocol stack 424. For the embodiment shown in FIG. 4, the data protocol stack at each device utilizes TCP and/or UDP operating on top of IP.

In general, a data protocol stack may implement any combination of protocols for any number of layers. Wireless device 120a communicates with TE2 device 110a via an Rm interface 428a and communicates with wireless network 130 via a Um interface 428b, where the "m" in Rm and Um stands for mobile.

Wireless network 130 typically assigns a single IPv4 (IP version 4) address to wireless device 120a for its Um interface 428b. This IP address is denoted as a.b.c.d. Wireless device 120a in turn assigns IP address a.b.c.d over to TE2 device 110a, which is then able to obtain general data/IP connectivity using this IP address. All wireless specific protocols still run in wireless device 120a. Inbound IP packets with destination IP address of a.b.c.d are sent from wireless network 130 to wireless device 120a and are received on Um interface 428b. Wireless device 120a forwards these IP packets to TE2 device 110a over Rm interface 428a. Similarly, outbound IP packets generated by TE2 device 110a are sent out of interface 418 to Rm interface 428a. Wireless device 120a then forwards these IP packets to Um interface 428b, which then sends these IP packets to wireless network 130.

The forwarding of IP packets between the Rm and Um interfaces at wireless device 120a may be achieved using standard IP routing based on destination IP address. For each IP packet, the destination IP address is extracted from the IP packet, and entries in a routing table are searched to find best outbound interface to reach this destination IP address. Alternatively, the Rm and Um interfaces may be bridged together since there is only one traffic path for IP packets in each direction. Bridging allows a first interface to be "glued" to a second interface so that IP packets received on the first interface are always forwarded to the second interface without going through IP routing. Bridging is an optimization for a case where there is only one possible data path for all IP packets received on the first interface. Bridging may be unidirectional or bi-directional.

Configuration 400 allows TE2 device 110a to reuse the IPv4 address assigned to wireless device 120a and to connect to wireless network 130 to obtain general data/IP connectivity. However, configuration 400 may not allow TE2 device 110a to access wireless data services that are normally available only to wireless device 120a. These wireless data services may be accessible only through special protocols and data handling capabilities that are built into wireless device 120a. These special protocols are processed by data protocol stack 424 and/or applications 420 running on top of data protocol stack 424 at wireless device 120a. To make these wireless data services available on TE2 device 110a, wireless device 120a would need to gain access to the services locally and would then typically forward the services to TE2 device 110a using a proprietary or standardized interface.

If wireless device 120a accesses and forwards wireless data services for TE2 device 110a, then applications 410 running in TE2 device 110a should be able to communicate with applications 420 running in wireless device 120a. Furthermore, applications 420 running in wireless device 120a should be able to receive data from wireless network 130, process the received data, and provide specific services to TE2 device 110a. All of this requires the ability to exchange data bi-directionally via three communication paths: (1) from TE2 device 10a to wireless network 130 via interfaces 418, 428a and 428b, (2) from wireless device 120a to TE2 device 110a via interfaces 418 and 428a, and (3) from wireless device 120a to wireless network 130 via Um interface 428b.

A wireless wide area network typically provides a single IPv4 address to wireless device 120a. In this case, IP packets cannot be sent to three different destinations (to interfaces 418, 428a, and 428b) using standard IP routing with the single IPv4 address. A wireless wide area network may be capable of assigning multiple IP addresses to wireless device 120a. In this case, wireless device 120a can configure one or multiple Um interfaces, assign a unique IP address to each Um interface on the wireless device, and assign a unique IP address to interface 418 on TE2 device 110a. Packets received from the wireless network can then be either forwarded to TE2 device 110a or the data protocol stack on wireless device 120a using routing based on the destination IP addresses in the packets. However, the communication path between TE2 device 110a and wireless device 120a still needs to be able to exchange IP packets. Furthermore, the availability of multiple IP addresses by itself does not ensure that TE2 device 110a can always obtain wireless data services. For example, a desired wireless data service may only be available from a network point of attachment (and hence through a specific network interface such as Um interface 428b) that is also used to provide general data/IP connectivity to TE2 device 110a. Since TE2 device 110a is already using the IP address assigned by the wireless network on that network interface, which is capable of providing the desired wireless data service, IP packets sent to this IP address still need to be routed selectively to different destinations—TE2 device 110a and wireless device 120a.

Figure 5:
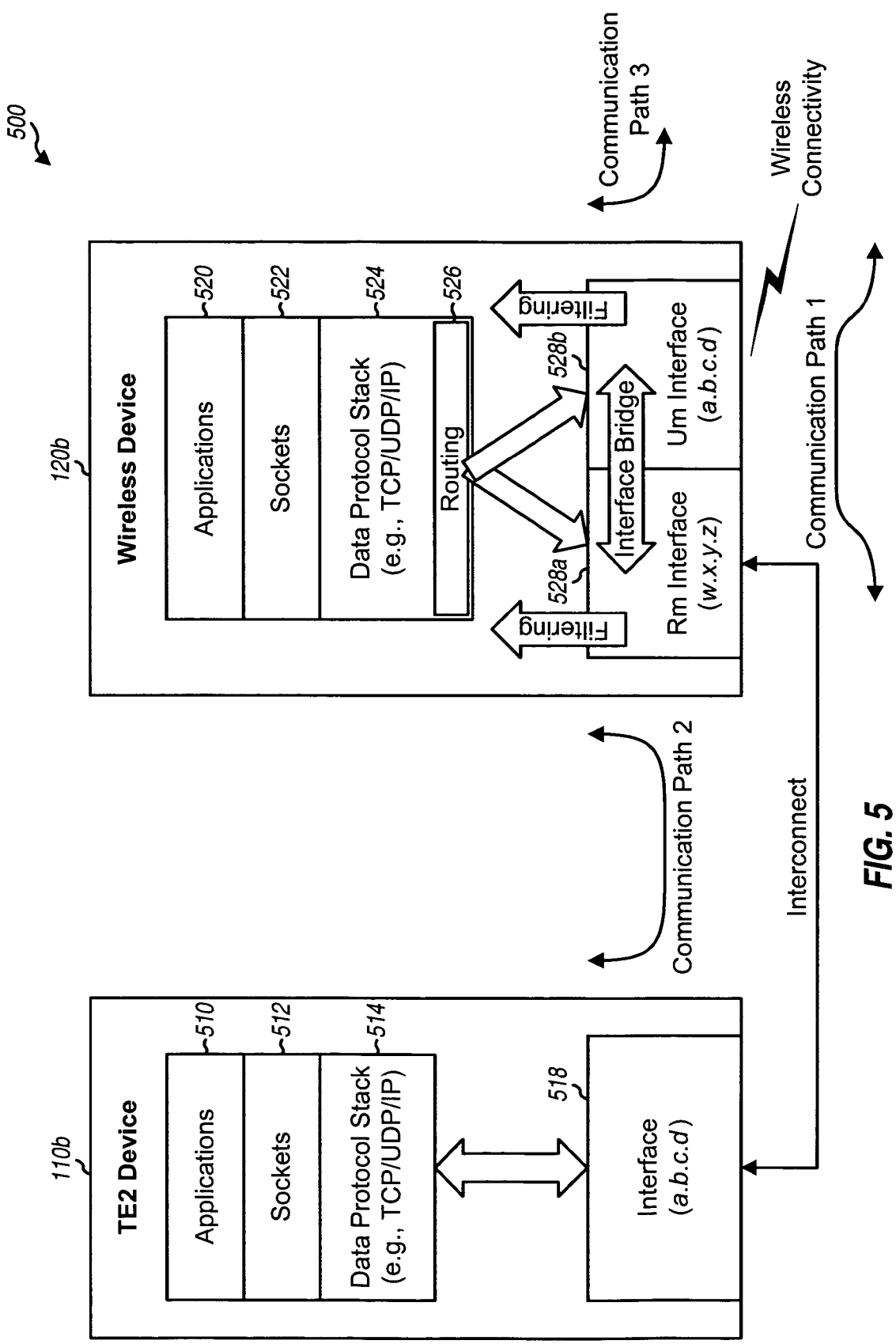
FIG. 5 shows a configuration for providing wireless data services and data/IP connectivity to a TE2 device with a single IP address.

FIG. 5 shows a configuration 500 for providing wireless data services and data/IP connectivity for a TE2 device 110b via a wireless device 120b with a single assigned IP address. TE2 device 110b and wireless device 120b are another embodiment of TE2 device 110 and wireless device 120, respectively, in FIG. 1. At TE2 device 110b, applications 510 and sockets 512 execute over a data protocol stack 514. TE2 device 110b communicates with wireless device 120b via an interface 518. At wireless device 120b, applications 520 and sockets 522 execute over a data protocol stack 524 and a routing layer 526. Routing layer 526 is typically implemented as part of the IP network layer and provides routing functionality for IP packets received over an IP network interface. Wireless device 120b communicates with TE2 device 110b via an Rm interface 528a and communicates with wireless network 130 via a Um interface 528b.

Wireless network 130 assigns a single IPv4 address a.b.c.d to wireless device 120b, which in turn assigns this IP address over to TE2 device 110b. TE2 device 110b is able to obtain general data/IP connectivity using this IPv4 address, as described above for configuration 400 in FIG. 4. All wireless specific protocols still run in wireless device 120b.

Configuration 500 allows TE2 device 110b to obtain various wireless data services, via wireless device 120b, using an IP-based interface. This may be achieved by providing the communication paths listed in Table 1. Each communication path may be implemented as described below.

TABLE 1

| Communication Path | Description |
| --- | --- |
| Communication Path 1 TE2 device to Wireless Network | Allow TE2 device 110b to exchange packets with wireless network 130 via Rm interface 528a and Um interface 528b using IP address a.b.c.d assigned over by wireless device 120b. |
| Communication Path 2 Wireless Device to TE2 Device | Allow wireless device 120b to exchange packets with TE2 device 110b via Rm interface 528a. |
| Communication Path 3 Wireless Device to Wireless Network | Allow wireless device 120b to exchange packets with wireless network 130 via Um interface 528b using the same IP address a.b.c.d that has been assigned over to TE2 device 110b. |

Communication Path 1

For communication path 1, TE2 device 110b can communicate with wireless network 130 using the mechanism described above for configuration 400 in FIG. 4. Wireless device 120b receives inbound IP packets from wireless network 130 destined to IP address a.b.c.d and simply forwards these IP packets to TE2 device 110b (unless these IP packets are filtered, as described below). As used herein, an IP packet "destined to" a given IP address refers to an IP packet having that IP address as the destination IP address. Wireless device 120b also forwards outbound IP packets received from TE2 device 110b to wireless network 130 (unless these IP packets are destined to wireless device 120b, as also described below).

Communication Path 2

For communication path 2, wireless device 120b can communicate with TE2 device 110b via an IP-based interface by making Rm interface 528a a fully functional interface for applications 520 running in wireless device 120b (instead of being a simple pass through bridge). A fully functional Rm interface 528a allows applications 520 to send IP packets to TE2 device 110b and to receive IP packets sent by TE2 device 110b to applications 520.

Rm interface 528a can be made fully functional by assigning this interface an IP address, which is denoted as w.x.y.z. This IP address may be a private IPv4 address since Rm interface 528a does not need to communicate with a node in a public data network. A private IP address is an IP address that is within a range of IP addresses designated for use as private IP addresses, such as a class A address with a network portion byte of 10 or a class B address with a network portion byte of 192.168. The IP address for Rm interface 528a may also be a link-local IPv6 (IP version 6) address that is within an IPv6 subnet assigned to wireless device 120b, as described below.

Applications 520 running on Rm interface 528a communicates with TE2 device 110b and possibly other TE2 devices. The TE2 device(s) may be coupled to Rm interface 528a via a point-to-point link (such as USB) or a wireless link (such as IEEE 802.11 or Bluetooth). In any case, wireless device 120b may be responsible for assigning IP addresses to all TE2 devices communicating with the wireless device. Wireless device 120b may derive a private IP address for itself. This private IP address should be unique among the IP addresses for all TE2 devices coupled to Rm interface 528a, so that each interface can be uniquely identified. Wireless device 120b may derive a unique private IP address using any available mechanism such as Address Resolution Protocol (ARP) for IPv4, Duplicate Address Detection (DAD) for IPv6, and so on. ARP and DAD are well known in the art.

Wireless device 120b configures Rm interface 528a with the private IP address w.x.y.z. Rm interface 528a then goes in an UP state, which means that the interface is connected to a network, is assigned a usable IP address, and can exchange data with the network. Applications 520 at wireless device 120b are then able to exchange data via Rm interface 528a with applications 510 at TE2 device 110b. Applications 510 and applications 520 may be informed of the private IP address w.x.y.z assigned to Rm interface 528a in advance or may be provided with this IP address through configuration.

Applications 520 running over Rm interface 528a explicitly bind to the Rm interface using any available mechanism. For example, most Socket APIs support this type of binding using a bind( ) function call. Wireless device 120b also updates its routing table with a host route entry to indicate that all IP packets destined to IP address a.b.c.d are sent out via Rm interface 528a to TE2 device 110b. This allows IP packets sent by applications 520 to applications 510 on TE2 device 110b with a source IP address of w.x.y.z to be sent out of Rm interface 528a instead of Um interface 528b. This also allows inbound IP packets received via Um interface 528b and destined to IP address a.b.c.d to be routed via Rm interface 528a to TE2 device 110b if a routing mechanism is used by wireless device 120b instead of the bridging mechanism described above.

Wireless device 120b can receive IP packets from TE2 device 110b by performing either address-based routing or packet filtering for Rm interface 528a. For address-based routing, applications 510 communicate with applications 520 by sending IP packets with destination IP address of w.x.y.z to Rm interface 528a. Wireless device 120b receives these IP packets via Rm interface 528a, extracts the destination IP address of w.x.y.z from these IP packets, and routes these IP packets up data protocol stack 524 using standard IP address-based routing. Address-based routing can thus correctly route IP packets destined to the private IP address, which is configured for Rm interface 528a, to the proper destination at wireless device 120b.

For packet filtering, wireless device 120b installs IP packet filters in Rm interface 528a. These IP packet filters are defined with appropriate parameters for applications 520 at wireless device 120b expecting to receive IP packets from TE2 device 110b. These filter parameters may include, for example, any one or any combination of the following:

IPv4—version, source IP address, destination IP address, address ranges, protocol, and type of service (TOS);

IPv6—version, source IP address, destination IP address, address ranges, traffic class, flow label, and next header;

UDP—source port, destination port, and port ranges; and

TCP—source port, destination port, and port ranges.

Type of service is a 1-byte integer value that identifies a specific service in a given communication context. The mapping between integer value and service is agreed upon previously. IPv6 traffic class is similar.

In general, any field in any protocol header may be used as a filter parameter. For example, filter parameters may be formed for other headers such as Encapsulated Security Protocol (ESP), Authentication Header (AH), IPv6 Routing Header Extension, and so on. Different IP packet filters may be used for different applications, sockets, and so on and may be defined with different sets of parameters. Any number of IP packet filters may be defined, and each IP packet filter may be associated with any set of parameters.

The IP packet filters are applied to IP packets received via Rm interface 528a. IP packets destined to the private IP address w.x.y.z and matching the parameters of the IP packet filters are sent up data protocol stack 524 to the recipient applications 520. IP packets destined to the private IP address w.x.y.z but not matching the parameters of any IP packet filter installed on Rm interface 528a (which are called "unmatched" IP packets) may be forwarded to Um interface 528b and sent to wireless network 130 just like other outbound IP packets. The unmatched IP packets may be due to no applications or sockets listening over Rm interface 528a at wireless device 120b.

Packet filtering has several advantages over address-based routing for Rm interface 528a. First, only IP packets that match the filter parameters are passed up to applications 520 and processed by wireless device 120b. Since the private IP address w.x.y.z is generated by wireless device 120b as a fake IP address, there may be a legitimate node with this same IP address. This legitimate node may be accessible to TE2 device 110b via wireless network 130, and TE2 device 110b may exchange IP packets with this node. Hence, forwarding the unmatched IP packets to wireless network 130 ensures that these IP packets can reach the intended recipient node. Second, packet filtering provides greater flexibility to select different kinds of IP packets that wireless device 120b can receive from TE2 device 110b. Wireless device 120b may terminate IP packets sent by TE2 device 110b to Rm interface 528a with the private IP address w.x.y.z as well as other multicast and broadcast IP addresses.

For example, a media streaming application typically joins a multicast group using Internet Group Management Protocol (IGMP) by sending IGMP packets to a multicast IP address which uniquely identifies the group. Each member in this multicast group is typically assigned a unicast IP address. A media streaming application server sends IP packets to all members of the group using the multicast IP address. Packet filtering allows wireless device 120b to terminate IP packets destined to the unicast IP address w.x.y.z as well as IP packets destined to the multicast IP address for the group. As another example, in order to support Text Messaging, data protocol stack 524 over Rm interface 528a may need to process IP packets destined to a mail server. This may be achieved by filtering specially tagged IP packets or IP packets with special email recipients.

Address-based routing may also be viewed as a special case of packet filtering whereby the destination IP address of w.x.y.z is the only filter parameter.

Communication Path 3

For communication path 3, wireless device 120b can communicate with wireless network 130 via an IP-based interface by applying packet filtering on Um interface 528b. As described above for configuration 400, wireless network 130 assigns IP address a.b.c.d to wireless device 120b, which then assigns this IP address over to TE2 device 110b in order to support data/IP connectivity for the TE2 device. Wireless device 120b is thus not able to use this IP address for itself but Um interface 528b should stay configured with this IP address in order to send and receive IP packets on behalf of TE2 device 110b. Inbound IP packets received on Um interface 528b and destined to IP address a.b.c.d are presumed to be for TE2 device 110b and should be routed to Rm interface 528a and forwarded to TE2 device 110b. Hence, these inbound IP packets cannot be passed up directly from Um interface 528b to data protocol stack 524 at wireless device 120b.

Wireless device 120b can receive IP packets via Um interface 528b by installing IP packet filters. Applications 520 and sockets 522 that need to send and/or receive IP packets over Um interface 528b can install appropriate IP packet filters in the Um interface. Each IP packet filter is associated with a set of parameters used to filter inbound IP packets. Any of the filter parameters described above may be used.

For inbound traffic, each IP packet filter in Um interface 528b can filter IP packets received from wireless network 130 based on the parameters for that filter. Each IP packet filter can forward each IP packet that matches all of the parameters for that filter to the appropriate application 520. For outbound traffic, applications 520 or their associated sockets 522 can send IP packets via Um interface 528b.

As an example, an application 520x supporting a position-based service and running on top of data protocol stack 524 at wireless device 120b may install an IP packet filter with the following parameters:

IP Destination Address=a.b.c.d
TCP Source Port=<Port number of a GPS server in wireless network 130>.

The terms "position-based" and "GPS" are used interchangeably herein. This IP packet filter would identify any inbound IP packets sent by the GPS server to wireless device 120b and would deliver these IP packets to application 520x, instead of forwarding them to TE2 device 110b. Application 520x can receive IP packets from wireless network 130 and process these IP packets to extract the pertinent location information. Application 520x may also send responses and/or data to the GPS server via Um interface 528b if and when needed.

For unreliable communication, such as with UDP, a socket only sends out data to wireless network 130 and does not receive data from the wireless network. Filtering is thus not needed for uni-directional transmission from wireless device 120b via Um interface 528b. For bi-directional transmission, a socket can install an IP packet filter on Um interface 528b in order to receive IP packets sent by wireless network 130. For reliable communication, such as with TCP, a socket sends out data to wireless network 130 and also receives data (e.g., for acknowledgments of outbound TCP traffic) from the wireless network. Hence, for reliable communication, there is a data exchange in both directions. Since protocol stack 524 may not be able to determine what an application intends to do, a general assumption may be made that every socket that sends data to wireless network 130 would eventually need to receive data from the wireless network. An IP packet filter may then be installed for each application 520 at wireless device 120b that needs to communicate with wireless network 130. If an application or socket only needs to send data to wireless network 130 and not receive any data from the wireless network, then packet filtering may be omitted.

Wireless device 120b may also communicate with wireless network 130 using protocols that are specific to the technology employed by wireless network 130. Thus, communication path 3 may be IP-based communication path or a network-specific communication path.

Figure 6:
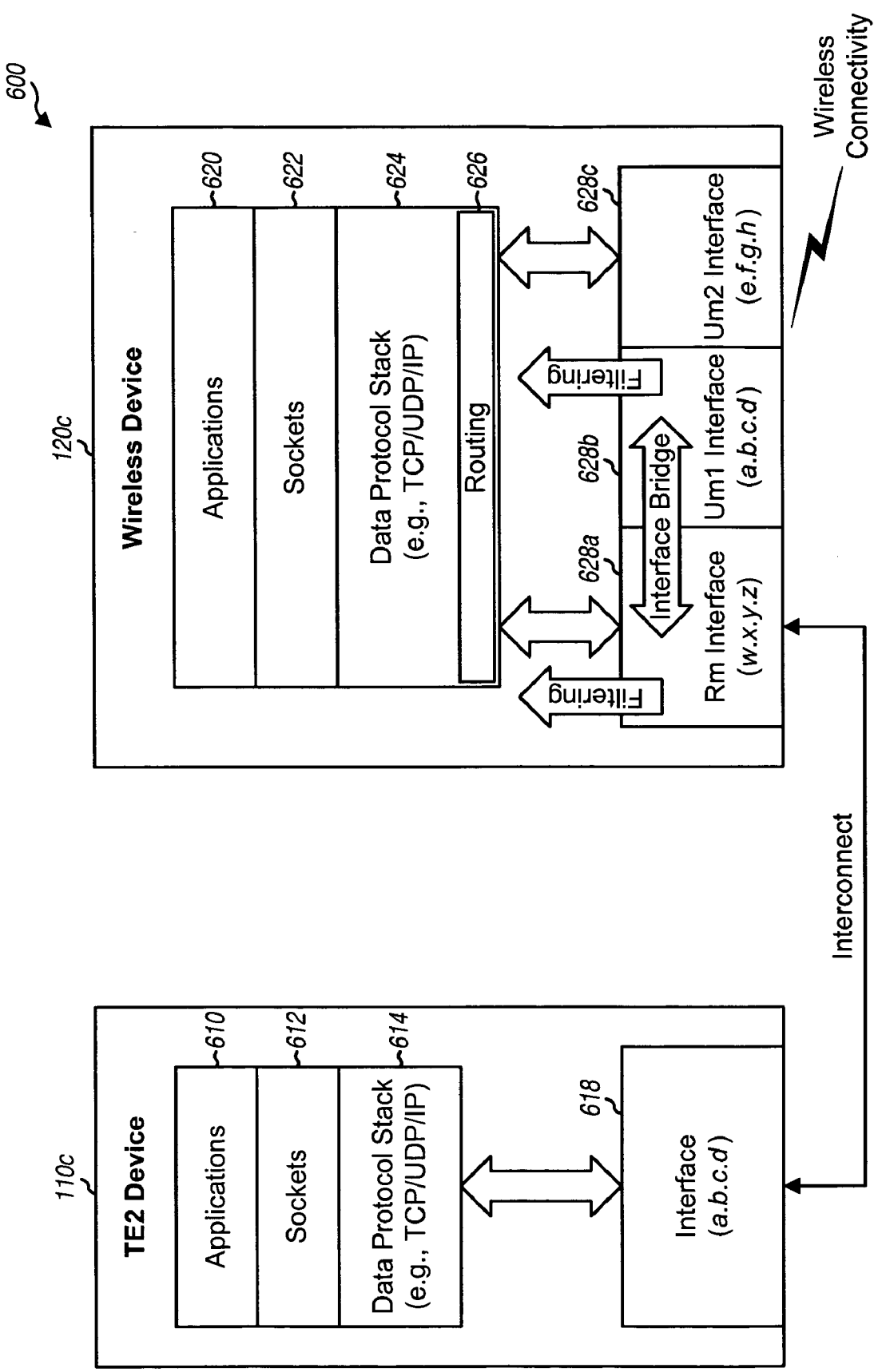
FIG. 6 shows a configuration for providing wireless data services and data/IP connectivity to a TE2 device with multiple IPv4 addresses.

FIG. 6 shows a configuration 600 for providing wireless data services and data/IP connectivity for a TE2 device 110c via a wireless device 120c with multiple assigned IPv4 addresses. TE2 device 110c and wireless device 120c are another embodiment of TE2 device 110 and wireless device 120, respectively, in FIG. 1. At TE2 device 110c, applications 610 and sockets 612 execute over a data protocol stack 614. TE2 device 110c communicates with wireless device 120c via an interface 618. At wireless device 120c, applications 620 and sockets 622 execute over a data protocol stack 624 and a routing layer 626. Wireless device 120c communicates with TE2 device 110c via an Rm interface 628a and communicates with wireless network 130 via both Um interfaces 628b and 628c.

For the embodiment shown in FIG. 6, wireless device 120c is assigned two IPv4 addresses, which are denoted as a.b.c.d and e.f.g.h. Wireless device 120c assigns IP address a.b.c.d over to TE2 device 110c and configures Um interface 628b with this IP address. Wireless device 120c uses IP address e.f.g.h for itself and configures Um interface 628c with this IP address. Um interface 626b may be bridged with Rm interface 628a for TE2 device 110c. Um interface 626b may stay configured with the IP address a.b.c.d assigned over to TE2 device 110c. Um interface 628c may stay in the UP state with the IP address e.f.g.h and can support various applications 620 and sockets 622 at wireless device 120c.

Wireless device 120c can communicate with wireless network 130 via an IP-based interface by sending and receiving IP packets via a Um interface 628c using its IP address e.f.g.h. Wireless device 120c does not need to perform packet filtering for IP packets received via Um interface 628c. Wireless device 120c may need to use IP address a.b.c.d assigned over to TE2 device 110c. This may be the case, for example, if a wireless data service is only available from a domain that is only accessible via IP address a.b.c.d. Wireless device may then exchange IP packets using IP address a.b.c.d via Um interface 628b by applying the techniques described above in FIG. 5 for communication path 3 between wireless device 120b and wireless network 130.

Wireless device 120c can communicate with TE2 device 110c via an IP-based interface by making Rm interface 628a a fully functional interface with the private IP address w.x.y.z, as described above for FIG. 5. TE2 device 110c can communicate with wireless device 120c via an IP-based interface by performing either address-based routing or packet filtering for Rm interface 628a at wireless device 120c, as also described above for FIG. 5.

Figure 7:
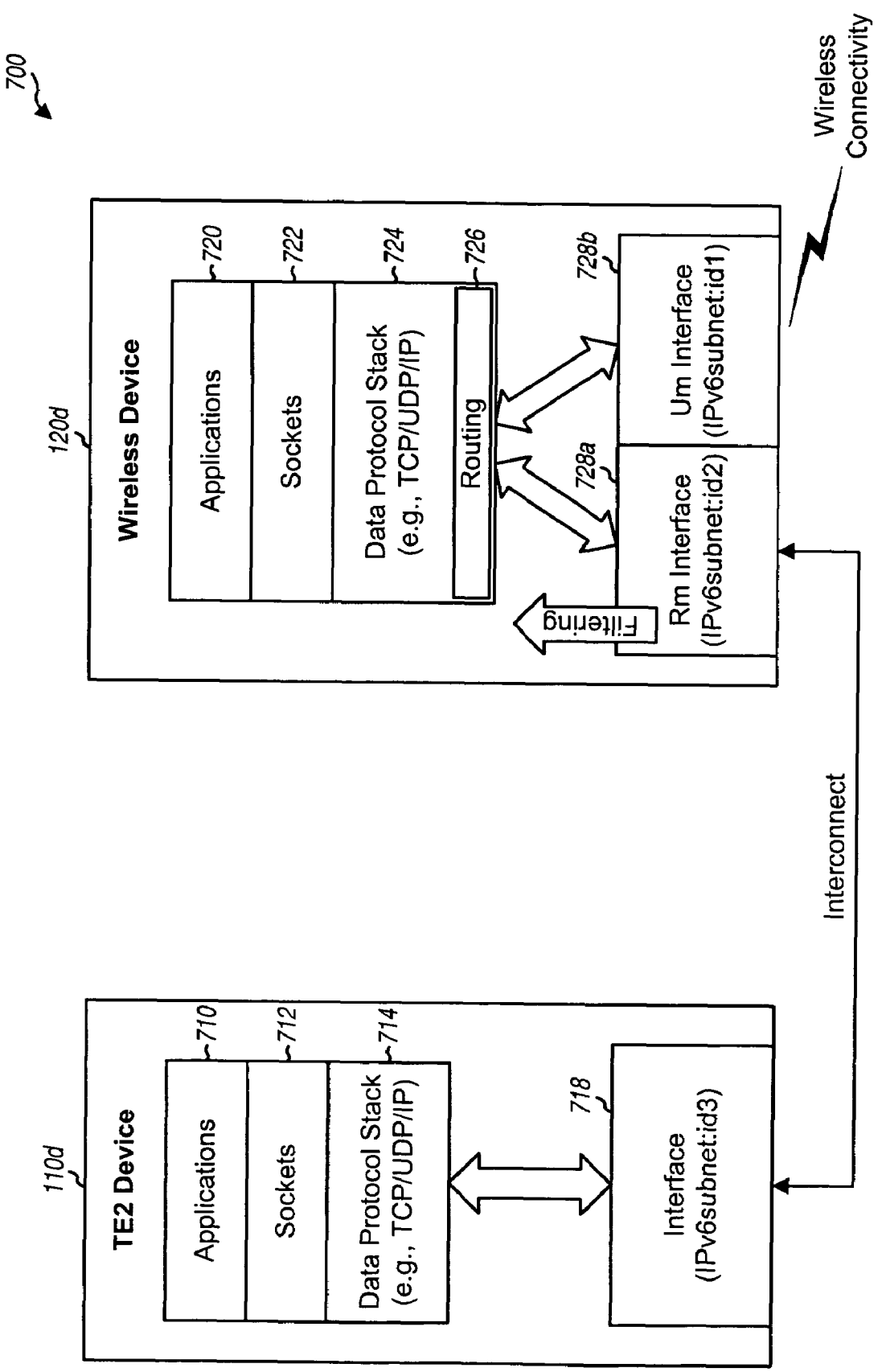
FIG. 7 shows a configuration for providing wireless data services and data/IP connectivity to a TE2 device with an IPv6 subnet.

FIG. 7 shows a configuration 700 for providing wireless data services and data/IP connectivity for a TE2 device 110d via a wireless device 120d with an IPv6 subnet. TE2 device 110d and wireless device 120d are another embodiment of TE2 device 110 and wireless device 120, respectively, in FIG. 1. At TE2 device 110d, applications 710 and sockets 712 execute over a data protocol stack 714. TE2 device 110d communicates with wireless device 120d via an interface 718. At wireless device 120d, applications 720 and sockets 722 execute over a data protocol stack 724 and a routing layer 726. Wireless device 120d communicates with TE2 device 110d via an Rm interface 728a and communicates with wireless network 130 via a Um interface 728b.

For the embodiment shown in FIG. 7, wireless device 120d is assigned an IPv6 subnet prefix that covers a range of IPv6 addresses. Wireless device 120d generates two unique identifiers id1 and id2 and appends these identifiers to the assigned IPv6 subnet prefix to generate two unique IPv6 addresses IPv6subnet:id1 and IPv6subnet:id2, respectively. Wireless device 120d assigns the first IPv6 address IPv6subnet:id1 to Um interface 728b and assigns the second IPv6 address IPv6subnet:id2 to Rm interface 728a. Wireless device 120d does not need to spoof or fake a private IP address for Rm interface 728a. Wireless device 120d may also provide the IPv6 subnet prefix to the TE2 devices coupled to Rm interface 728a. These TE2 devices can generate additional IPv6 addresses on the subnet using this IPv6 subnet prefix. For example, TE2 device 110d can generate an identifier (id3) for itself and forms an IPv6 address with the IPv6 subnet prefix and the identifier, which is denoted as IPv6subnet:id3. Wireless device 120d ensures that the identifiers generated by the TE2 devices coupled to Rm interface 728a are unique for the subnet using Duplicate Address Detection.

Um interface 728b can stay in the UP state with its own IPv6 address. A host route entry is added in the routing table for the IPv6 address assigned to TE2 device 110d so that IP packets received via Um interface 728b and destined to this IPv6 address can be routed over to Rm interface 728a and sent to TE2 device 110b. Packet filtering may be performed on Rm interface 728a to capture broadcast and certain multicast packets received from TE2 device 110b.

FIGS. 5 through 7 show some exemplary configurations that can provide wireless data services and data/IP connectivity to TE2 device 110 via wireless device 120 using an IP-based interface. Other configurations may also be implemented based on the description provided herein. For example, multiple private IPv4 addresses or IPv6 addresses may be generated and assigned to the Rm interface. Each IP address can support diversified applications or functionalities. The Rm interface may also be assigned both IPv4 and IPv6 addresses simultaneously if TE2 device 110 is a dual-stack host that supports both IPv4 and IPv6.

Wireless Data Services

Figure 8:
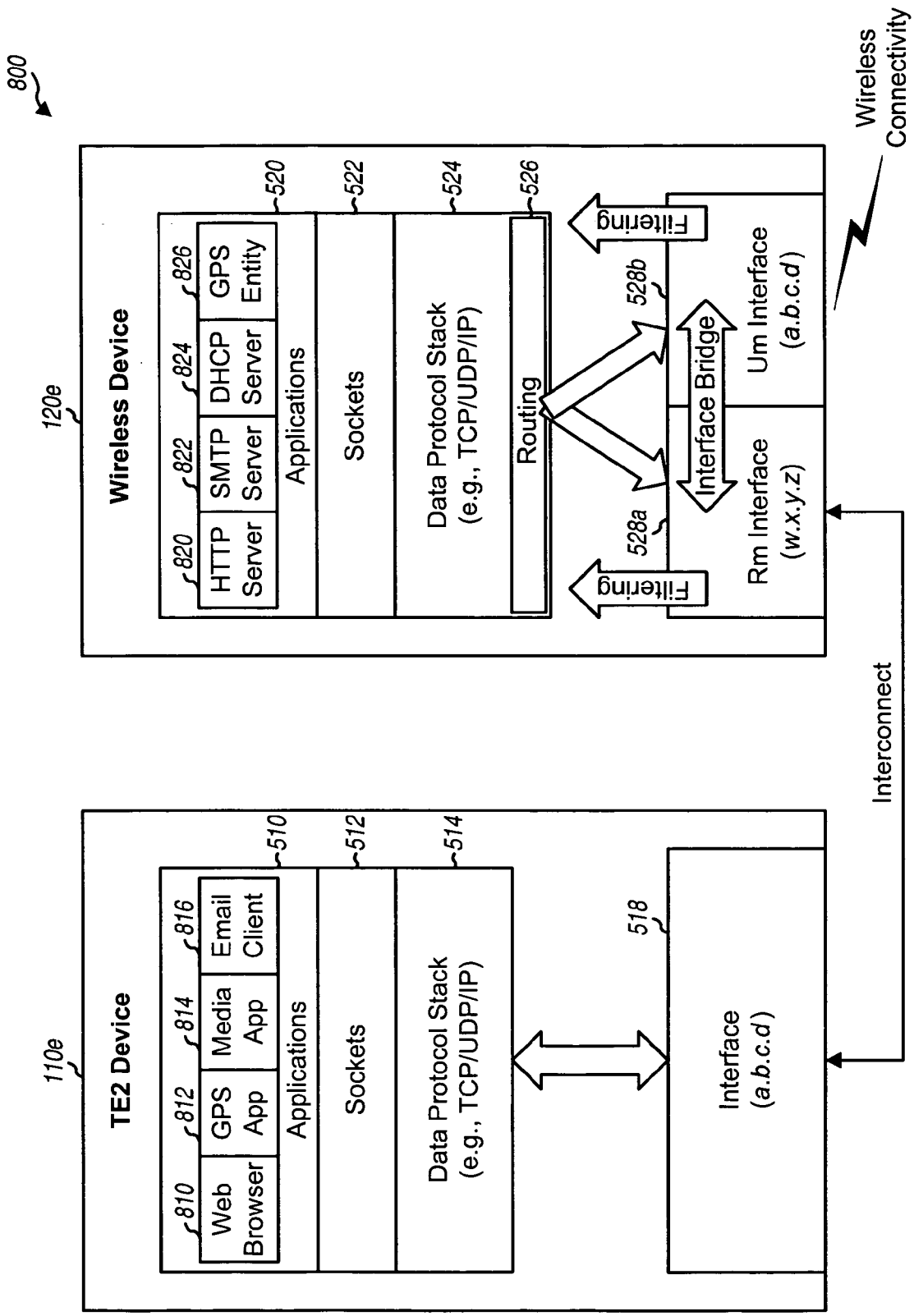
FIG. 8 shows another configuration with a TE2 device and a wireless device.

FIG. 8 shows a configuration 800 with a TE2 device 110e and a wireless device 120e, which include all of the elements of TE2 device 110b and wireless device 120b, respectively. Wireless device 120e further implements a Hypertext Transfer Protocol (HTTP) server 820, a Simple Mail Transfer Protocol (SMTP) server 822, and a Dynamic Host Configuration Protocol (DHCP) server 824. HTTP server 820 supports transfer of content between wireless device 120e and TE2 device 110e. SMTP server 822 supports email-based applications. DHCP server 824 supports dynamic IP configuration for TE2 device 110e. Wireless device 120e may implement different and/or other servers to support other services for TE2 device 110e. TE2 device 110e has a Web browser 810, a position-based/GPS application 812, a media streaming application 814, and an email client 816 running within applications 510. TE2 device 110e may also support different and/or other end applications. Some exemplary wireless data services supported by configuration 800 are described below.

Position-based services. Protocols used for position-based applications are often built into wireless device 120e. Consequently, TE2 device 110e is typically not able to access position-based services directly. Wireless device 120e obtains location information from wireless network 130 based on technology specific protocols and translates this information into easy to use location parameters. TE2 device 110e can then obtain the location parameters from wireless device 120e and use these parameters to support position-based applications running in TE2 device 110e.

A mobile user or GPS application 812 running in TE2 device 110e may initiate communication with wireless device 120e to access a position-based service and/or to obtain location information. GPS application 812 may be a Web-based application that allows the user to query for location information using Web browser 810 running in TE2 device 110e. GPS application 812 may then send an HTTP Get request to a URL that points to HTTP server 820 running in wireless device 120e. GPS application 812 runs over a TCP/IP stack and may send the HTTP Get request directly to the private IP address w.x.y.z for Rm interface 528a or may use a special URL that points to Rm interface 528a.

HTTP server 820 receives the HTTP Get request from TE2 device 110e and communicates with a GPS entity 826 to obtain the requested location information. GPS entity 826 may already have the requested location information stored (or cached) in local memory from previous lookups or may decide to obtain new location information from wireless network 130. GPS entity 826 communicates over Um interface 528b (e.g., using technology specific protocols) with the appropriate GPS server in wireless network 130 to obtain new location information (e.g., to perform a position fix). GPS entity 826 then provides the (new or cached) location information to HTTP server 820. HTTP server 820 then fulfills the request from TE2 device 110e with an HTTP response that is sent to IP address a.b.c.d. This HTTP response is sent out through Rm interface 528b because the host route entry for IP address a.b.c.d in the routing table indicates that all outbound IP packets destined to this IP address are to be sent out through Rm interface 528b.

GPS application 812 at TE2 device 110e receives the HTTP response from HTTP server 820, extracts the location parameters from this response, and provides the extracted location parameters to Web browser 810. Web browser 810 can use the location parameters to display location specific content to the user, such as hotels, restaurants, and so on.

Multimedia steaming and broadcast services. Wireless network 130 may have specialized mechanisms to discover and register for streaming media services. For example, wireless network 130 may be an EVDO network that supports IP multicasting but does not support IGMP to register for multicast groups. Media streaming application 814 running in TE2 device 110e typically uses IGMP messages in order to join and leave a group and to receive multicast contents. Wireless device 120e receives these IGMP messages, processes the messages, and registers for the desired content on behalf of TE2 device 110. Furthermore, application 814 listens on well-known multicast IP addresses to obtain programming information. Wireless device 120e may receive this information from specific signaling sent by wireless network 130 and send the information to the appropriate multicast IP address and via Rm interface 528a to media streaming application 814 at TE2 device 110e.

Text messaging. Wireless network 130 may support text messaging, which is also commonly referred to as Short Message Service (SMS) or Short Data Burst (SDB). Text messaging refers to a technology that allows small size text messages to be sent over signaling channels in wireless network 130. This saves system resources that may then be allocated to traffic channels used to send larger amounts of data. Text messaging often uses the unused bandwidth in the signaling channels to send data associated with text messages over wireless network 130 to recipient destinations such as wireless device 120e.

It is desirable and convenient for the mobile user at TE2 device 110e to use regular email client 816 or Web browser 810 to send small text messages over wireless network 130 in the same manner as regular email messages. SMTP over TCP/IP is typically used to transport regular email messages. For outbound email messages carrying short text messages, TE2 device 110e can send these email messages either with a special tag or to a special domain name in the destination address. SMTP server 822 can receive these email messages from TE2 device 110e and can send the email messages over wireless network 130 using network specific techniques such as SMS or SDB. For inbound email messages for TE2 device 110e, wireless device 120e can receive SMS messages from wireless network 130, extract the text from the SMS messages, form IP-based email messages containing the extracted text, and send these email messages via Rm interface 528a to the email client running in TE2 device 110e.

Dynamic address assignment using DHCP. TE2 device 110e may use AT commands and PPP to set up a data session and obtain an IP address and other configuration information from wireless device 120e. In this case, interface 518 on TE2 device 110e behaves like a dial-up modem interface. Interface 518 can function like an IP-based interface if this information can obtain IP configuration dynamically using DHCP or other standard protocols commonly used in a LAN environment. Since wireless network 130 typically does not support LAN-based address assignment schemes such as DHCP, this functionality may be supported by wireless device 120e.

For dynamic IP configuration with DHCP, TE2 device 110e initially broadcasts a DHCPDISCOVER message from interface 518. This message is received via Rm interface 528a at wireless device 120e and forwarded to DHCP server 824. DHCP server 824 processes the DHCPDISCOVER message and obtains IP configuration from wireless network 130 (if needed) using network technology specific procedures. DHCP server 824 then sends a DHCPOFFER message to TE2 device 110e. This response message may contain (1) the IP address a.b.c.d that TE2 device 110e can use as its IP address, (2) an IP address that TE2 device 110e can use to send IP packets outside of its subnet, which may be the IP address of IP gateway 150 in FIG. 1, and (3) an IP address of DHCP server 824, which may be an IP address that is spoofed or faked by wireless device 120e. TE2 device 110e may thereafter send DHCP messages to DHCP server 824 using the spoofed IP address, as advertised in the DHCPOFFER message. These DHCP messages are received via RM interface 528a and provided to DHCP server 824 using routing or packet filtering.

In general, the techniques and configurations described herein allow a TE2 device to obtain wireless data services via an attached wireless device using an IP-based interface. Some exemplary wireless data services have been described above for a specific configuration 800. Other services may also be provided to the TE2 device.

The wireless data services may be wireless device centric and may require special means and/or protocols to obtain via the wireless network. The techniques described herein can hide these intricacies from the TE2 device. The end applications running in the TE2 device can obtain these wireless data services via the wireless device using an IP-based interface. These end applications may employ standard IP-based protocols, such as Web browsers, that operate over an IP-based framework. Some of the benefits of supporting an IP-based interface for the TE2 device include:

The end applications in the TE2 device can employ IP-based protocols that are well understood by data application developers, are highly stable, and have proven functionality.

The end applications can reuse many existing applications that are based on standard IP protocols.

The end applications can use standardized and well-known user interfaces, such as Web browser-based user interfaces, which are commonly used by users and are highly popular. These user interfaces require an IP-based framework in order to provide contents to the users.

The IP-based interface is uniform and independent of (1) the type, architecture, and manufacturer of the wireless device, (2) the wireless technology supported and used by the wireless device to access the desired wireless data services, (3) the environment or operating system for the TE2 device, and (4) the physical interconnect between the TE2 device and the wireless device.

Figure 9:
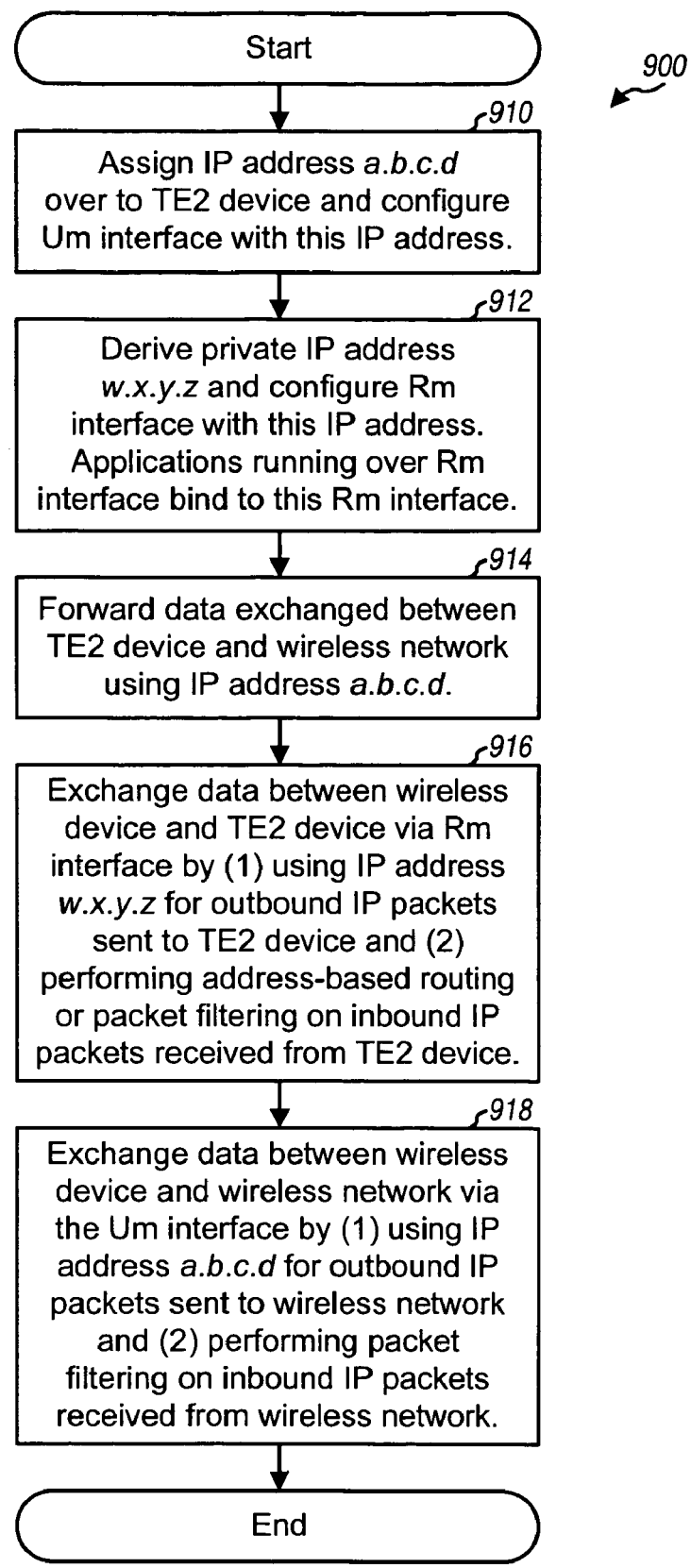
FIG. 9 shows a process performed by a wireless device to support wireless data services on a TE2 device using an IP-based interface.

FIG. 9 shows a process 900 performed by wireless device 120 to support wireless data services on TE2 device 110 using an IP-based interface. Initially, wireless device 120 assigns its IP address a.b.c.d over to TE2 device 110 and configures its Um interface with this IP address (block 910). TE2 device 110 uses IP address a.b.c.d to obtain general data/IP connectivity. Wireless device 120 derives a private IP address w.x.y.z and configures its Rm interface with this IP address (block 912). Wireless device 120 uses IP address w.x.y.z for communication with TE2 device 110. Applications running over the Rm interface at wireless device 120 bind to this Rm interface.

Thereafter, wireless device 120 forwards data exchanged between TE2 device 110 and wireless network 130 using IP address a.b.c.d for communication path 1 (block 914). This data is not intended for wireless device 120 since it does not match any of the packet filters installed on the Um interface.

Wireless device 120 may also exchange data with TE2 device via Rm interface for communication path 2 by (1) using IP address w.x.y.z for outbound packets sent to TE2 device 110 and (2) performing either address-based routing or packet filtering on inbound packets received from TE2 device 110 (block 916). Wireless device 120 may also exchange data with the wireless network 130 via the Um interface for communication path 3 by (1) using IP address a.b.c.d for outbound packets sent to wireless network 130 and (2) performing packet filtering on inbound packets received from the wireless network (block 918).

Figure 10:
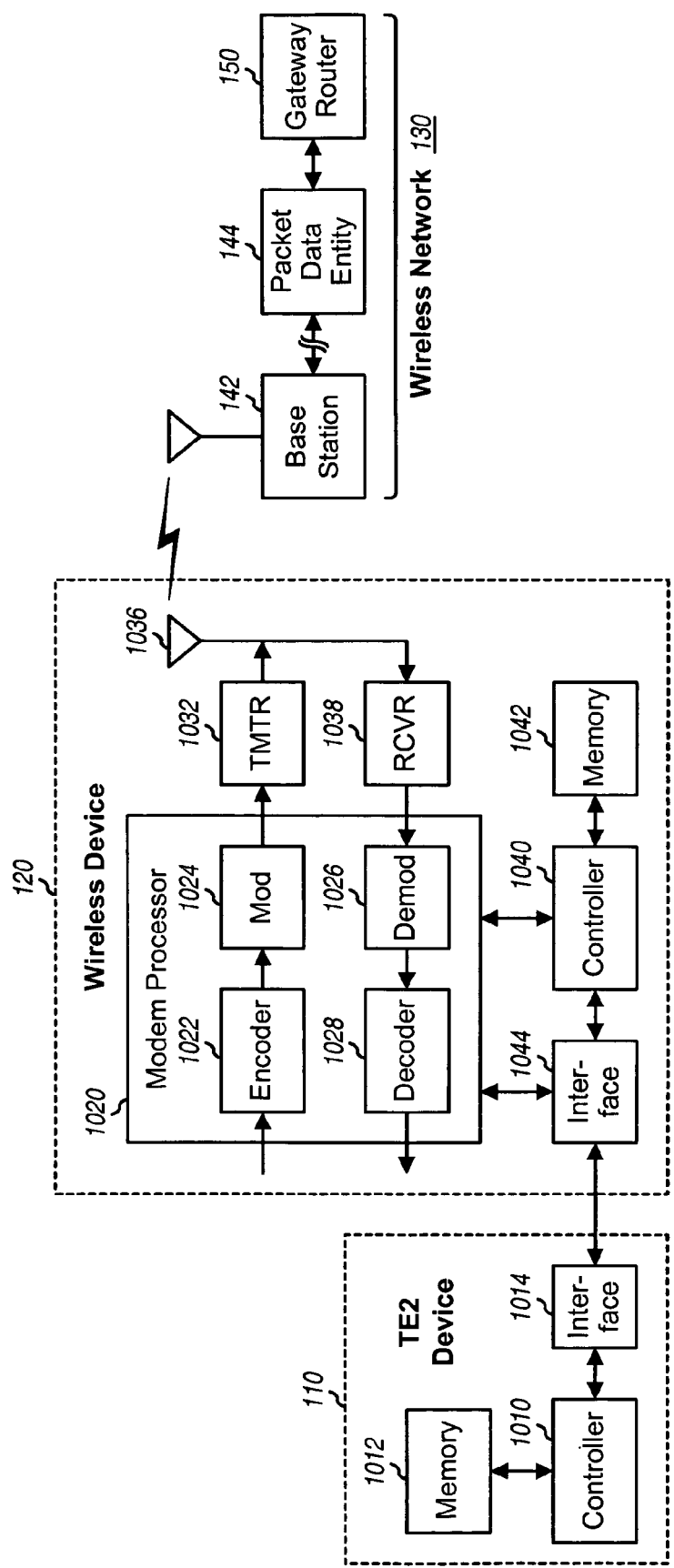
FIG. 10 shows a block diagram of a TE2 device and a wireless device.

FIG. 10 shows a block diagram of TE2 device 110 and wireless device 120. TE2 device 110 includes a controller 1010, a memory 1012, and an interface unit 1014. Controller 1010 performs processing for TE2 device 110 and further directs the operation of various units within the TE2 device. Controller 1010 may implement a DHCP client (other similar protocols such as PPP client) for dynamic IP configuration, perform processing to exchange IP packets with wireless device 120 and/or wireless network 130, and so on. Memory unit 1012 stores program codes and data used by controller 1010. Interface unit 1014 provides an interface for communication with wireless device 120 and may perform processing for IP and the link layer (e.g., Ethernet). Interface unit 1014 may be implemented with software (e.g., by controller 1010) or hardware.

Wireless device 120 includes a wireless modem for communication with wireless network 130, a controller 1040, a memory 1042, and an interface unit 1044. On the transmit path of the wireless modem, data and signaling to be sent by wireless device 120 are processed (e.g., formatted, encoded, and interleaved) by an encoder 1022 and further processed (e.g., modulated, spread, channelized, and scrambled) by a modulator (Mod) 1024 to obtain a stream of data chips. A transmitter unit (TMTR) 1032 then conditions (e.g., converts to analog, filters, amplifies, and frequency upconverts) the data chip stream to generate an uplink signal, which is transmitted via an antenna 1036. On the receive path, downlink signals transmitted by base stations in wireless network 130 (e.g., a CDMA or UMTS network) are received by antenna 1036 and provided to a receiver unit (RCVR) 1038. Receiver unit 1038 conditions (e.g., filters, amplifies, and frequency downconverts) the received signal and further digitizes the conditioned signal to obtain data samples. A demodulator (Demod) 1026 processes (e.g., descrambles, despreads, channelizes, and demodulates) the samples to obtain symbols. A decoder 1028 further processes (e.g., deinterleaves and decodes) the symbols to obtain decoded data. Encoder 1022, modulator 1024, demodulator 1026, and decoder 1028 may be implemented by a modem processor 1020. These units perform processing in accordance with the wireless technology (e.g., W-CDMA or IS-2000) used by wireless network 130.

Controller 1040 directs the operation of the various units within wireless device 120. Controller 1040 may implement process 900 shown in FIG. 9 and may implement the various servers and applications shown in FIGS. 4 through 8. Memory unit 1042 stores program codes and data used by controller 1040 and other units. Interface unit 1044 provides an interface for communication with TE2 device 110 and/or wireless network 130, may implement the Rm interface and/or the Um interface, and may perform processing for IP and the link layer.

The techniques described herein for supporting wireless data services on a TE2 device using an IP-based interface may be implemented by various means. For example, these techniques may be implemented in hardware, software, or a combination thereof. For a hardware implementation, the processing units for the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques may be implemented with modules (e.g., procedures, functions, and so on) that perform the functions described herein. The software codes may be stored in a memory unit (e.g., memory unit 1042 in FIG. 10) and executed by a processor (e.g., controller 1040). The memory unit may be implemented within the processor or external to the processor.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of providing wireless data service using an Internet Protocol (IP)-based interface, comprising:
    providing a first wireless data service via a first application on a wireless device;
    obtaining a single IP address by the wireless device from a wireless network;
    assigning the single IP address over to a terminal equipment to define a first interface on the terminal equipment with the wireless device;
    assigning the single IP address to define a second interface on the wireless device with the wireless network;
    deriving a private IP address for use by the wireless device to exchange packets with the terminal equipment;
    assigning the private IP address to define a third interface on the wireless device with the terminal equipment;
    providing a first IP-based communication path between the terminal equipment and the wireless network via the second interface and the third interface on wireless device and using the single IP address;
    providing a second IP-based communication path between the wireless device and the terminal equipment using the third interface and the first interface;
    providing a third IP-based communication path between the wireless device and the wireless network using the second interface and using the single IP address;
    implementing the first, second and third IP-based communication paths for communications between the wireless device, the wireless network and the terminal equipment; and
    providing the first wireless data service to a second application on the terminal equipment via the first application on the wireless device using at least the second communication path, wherein the private IP address enables the wireless device to distinguish packets corresponding to the first wireless data service from general communication packets corresponding to the terminal equipment.

2. The method of claim 1, wherein the providing the first IP-based communication path comprises
forwarding outbound packets received from the terminal equipment with the single IP address as a source address to the wireless network, and
forwarding inbound packets received from the wireless network with the single IP address as a destination address to the terminal equipment.

3. The method of claim 2, wherein the using the private IP address to exchange packets with the terminal equipment comprises
sending outbound packets from the wireless device to the terminal equipment with the private IP address as the respective source address, and
receiving inbound packets sent from the terminal equipment to the wireless device with the private IP address as the respective destination address.

4. The method of claim 1, wherein the using the private IP address to exchange packets with the terminal equipment comprises
sending outbound packets from the wireless device to the terminal equipment with the private IP address as a source address, and
receiving inbound packets sent from the terminal equipment to the wireless device with the private IP address as a destination address.

5. The method of claim 1, wherein the using the private IP address to exchange packets with the terminal equipment comprises
performing address-based routing to receive inbound packets sent from the terminal equipment to the wireless device with the private IP address as a destination address.

6. The method of claim 1, wherein the using the private IP address to exchange packets with the terminal equipment comprises
performing packet filtering to receive inbound packets sent from the terminal equipment to the wireless device with the private IP address as a destination address.

7. The method of claim 1, wherein the providing the second IP-based communication path comprises
performing packet filtering to receive inbound packets sent from the terminal equipment to the wireless device with a multicast address or a broadcast address as a destination address.

8. The method of claim 1, wherein the single IP address assigned to the wireless device is an IPv6 subnet prefix, and wherein the providing the second IP-based communication path comprises
deriving a first IPv6 address for use by the wireless device with the IPv6 subnet prefix, and
using the first Ipv6 address to exchange packets with the terminal equipment, wherein a second IPv6 address generated with the IPv6 subnet prefix is used by the terminal equipment.

9. The method of claim 1, wherein the providing the third IP-based communication path comprises
sending outbound packets from the wireless device to the wireless network using the single IP address as a source address, and
receiving inbound packets sent from the wireless network to the wireless device using packet filtering.

10. The method of claim 1, further comprising:
providing a position-based service to the terminal equipment using the second IP-based communication path.

11. The method of claim 1, further comprising:
providing a text messaging service to the terminal equipment using the second IP-based communication path.

12. The method of claim 1, further comprising:
providing multimedia and broadcast services to the terminal equipment using the second IP-based communication path.

13. The method of claim 1, further comprising:
implementing a Hypertext Transfer Protocol (HTTP) server at the wireless device to provide content to the terminal equipment.

14. The method of claim 1, further comprising:
implementing a Simple Mail Transfer Protocol (SMTP) server at the wireless device to receive and forward text email messages sent by the terminal equipment.

15. The method of claim 1, further comprising:
dynamically providing IP configuration to the terminal equipment via the second IP-based communication path.

16. The method of claim 1, further comprising:
implementing a Dynamic Host Configuration Protocol (DHCP) server at the wireless device to provide dynamic IP configuration to the terminal equipment.

17. The method of claim 1 further comprising:
receiving a data packet at the wireless device;
applying a packet filter to the data packet to determine a forwarding of the data packet, wherein the packet filter comprises a parameter corresponding to the first application;
forwarding the data packet to the first application if the applying results in a match between the data packet and the parameter, or forwarding the data packet to the terminal equipment or the wireless network if the applying does not result in a match between the data packet and the parameter.

18. The method of claim 17 further comprising wherein receiving the data packet further comprises receiving an inbound packet sent from the terminal equipment to the wireless device with the private IP address as a destination address;
if the inbound packet comprises data matching the parameter, then forwarding the inbound packet to the first application; and
if the inbound packet does not comprise data matching the parameter, then forwarding the inbound packet to the wireless network.

19. The method of claim 17 further comprising wherein receiving the data packet further comprises receiving an inbound packet sent from the wireless network to the wireless device with the single IP address as a destination address and the inbound packet having an application specific filter parameter;
if the application specific filter parameter matches the parameter corresponding to the first application, then forwarding the inbound packet to the first application; and
if the application specific filter parameter does not match the parameter corresponding to the first application, then forwarding the inbound packet to the terminal equipment.

20. The method of claim 17, wherein the parameter includes data derived from a field in a protocol header.

21. A wireless device in a wireless network, comprising:
an interface unit coupled to a terminal equipment and operative to provide a first Internet Protocol (IP)-based interface communication path between the terminal equipment and the wireless network via the wireless devices, to provide a second IP-based communication path between the wireless device and the terminal equipment, and to provide a third IP-based communication path between the wireless device and the wireless network;

a controller operative to implement the first, second, and third IP-based communication paths using a single IP address assigned to the wireless device by the wireless network, and further operative to assign the single IP address over to the terminal equipment for use in the first IP-based communication path, and wherein the controller is further operative to derive a private IP address for use by the wireless device to exchange packets with the terminal equipment, and wherein the controller is further operative to implement the third IP-based communication path using the single IP address assigned to the wireless device; and a wireless data service module operative to provide a first wireless data service via a first application on the wireless device, and further operative to provide the first wireless data service to a second application on the terminal equipment via the first application on the wireless device using at least the second communication path, wherein the private IP address enables the wireless device to distinguish packets corresponding to the first wireless data service from general communication packets corresponding to the terminal equipment.

22. The apparatus of claim 21, wherein the interface unit is operative to forward outbound packets received from the terminal equipment with the single IP address as a source address to the wireless network and to forward inbound packets received from the wireless network with the single IP address as a destination address to the terminal equipment.

23. The apparatus of claim 22, wherein the interface unit is operative to send outbound packets from the wireless device to the terminal equipment with the private IP address as the respective source address and to perform address-based routing or packet filtering to receive inbound packets sent from the terminal equipment to the wireless device with the private IP address as the respective destination address.

24. The apparatus of claim 21, wherein the interface unit is operative to send outbound packets from the wireless device to the terminal equipment with the private IP address as a source address and to perform address-based routing or packet filtering to receive inbound packets sent from the terminal equipment to the wireless device with the private IP address as a destination address.

25. The apparatus of claim 21, wherein the interface unit is operative to send outbound packets from the wireless device to the wireless network using the single IP address as a source address and to receiving inbound packets sent from the wireless network to the wireless device using packet filtering.

26. The apparatus of claim 21, wherein the controller is further operable to implement at least one of a position-based service or a text messaging service or multimedia and broadcast services to the terminal equipment using the second IP-based communication path.

27. The apparatus of claim 21, wherein the controller is further operable to implement at least one of a Hypertext Transfer Protocol (HTTP) server at the wireless device to provide content to the terminal equipment or a Simple Mail Transfer Protocol (SMTP) server at the wireless device to receive and forward text email messages sent by the terminal equipment.

28. The apparatus of claim 21 wherein the wireless data service module is further operable to:

receive a data packet at the wireless device;

apply a packet filter to the data packet to determine a forwarding of the data packet, wherein the packet filter comprises a parameter corresponding to the first application; and forward the data packet to the first application if the applying results in a match between the data packet and the parameter, or forward the data packet to the terminal equipment or the wireless network if the applying does not result in a match between the data packet and the parameter.

29. The apparatus of claim 28, wherein the wireless data service module is further operable to:

receive an inbound packet sent from the terminal equipment to the wireless device with the private IP address as a destination address;

if the inbound packet comprise a match with the parameter, then forward the inbound packet to the first application; and if the inbound packet does not comprise a match with the parameter, then forward the inbound packet to the wireless network.

30. The apparatus of claim 28, wherein the wireless data service module is further operable to:

receive an inbound packet sent from the wireless network to the wireless device with the single IP address as a destination address and the inbound packet having an application specific filter parameter;

if the application specific filter parameter matches the parameter corresponding to the first application, then forwarding the inbound packet to the first application; and if the application specific filter parameter does not match the parameter corresponding to the first application, then forwarding the inbound packet to the terminal equipment.

31. The apparatus of claim 28, wherein the parameter includes data derived from a field in a protocol header.

32. An apparatus in a wireless network, comprising:

means for providing a first wireless data service via a first application on a wireless device;

means for obtaining a single IP address by the wireless device from a wireless network;

means for assigning the single IP address over to a terminal equipment to define a first interface on the terminal equipment with the wireless device;

means for assigning the single IP address to define a second interface on the wireless device with the wireless network;

means for deriving a private IP address for use by the wireless device to exchange packets with the terminal equipment;

means for assigning the private IP address to define a third interface on the wireless device with the terminal equipment;

means for providing a first IP-based communication path between the terminal equipment and the wireless network via the second interface and the third interface on wireless device and using the single IP address;

means for providing a second IP-based communication path between the wireless device and the terminal equipment using the third interface and the first interface;

means for providing a third IP-based communication path between the wireless device and the wireless network using the second interface and using the single IP address;

means for implementing the firsts, second and third IP-based communication paths for communications between the wireless device, the wireless network and the terminal equipment; and means for providing the first wireless data service to a second application on the terminal equipment via the first application on the wireless device using at least the second communication path, wherein the private IP address enables the wireless device to distinguish packets corresponding to the first wireless data service from general communication packets corresponding to the terminal equipment.

33. The apparatus of claim 32, wherein the means for providing the first IP-based communication path comprises means for forwarding outbound packets received from the terminal equipment with the single IP address as a source address to the wireless network, and means for forwarding inbound packets received from the wireless network with the single IP address as a destination address to the terminal equipment.

34. The apparatus of claim 32, wherein the means for providing the second IP-based communication path comprises means for sending outbound packets from the wireless device to the terminal equipment using the private IP address as a source address, and means for performing address-based routing or packet filtering to receive inbound packets sent from the terminal equipment to the wireless device with the private IP address as a destination address.

35. The apparatus of claim 32, wherein the means for providing the third IP-based communication path comprises means for sending outbound packets from the wireless device to the wireless network using the single IP address as a source address, and means for receiving inbound packets sent from the wireless network to the wireless device using packet filtering.

36. A processor readable media, excluding an electromagnetic carrier signal, for storing instructions operable in a wireless device to:

providing a first wireless data service via a first application on a wireless device;

obtaining a single IP address by the wireless device from a wireless network;

assigning the single IP address over to a terminal equipment to define a first interface on the terminal equipment with the wireless device;

assigning the single IP address to define a second interface on the wireless device with the wireless network;

deriving a private IP address for use by the wireless device to exchange packets with the terminal equipment. assigning the private IP address to define a third interface on the wireless device with the terminal equipment;

provide a first IP-based communication path between the terminal equipment and the wireless network via second interface and the third interface on the wireless device and using the single IP address;

provide a second IP-based communication path between the wireless device and the terminal equipment using the third interface and the first interface;

implement the first, second and third IP-based communication paths for communications between the wireless device, the wireless network and the terminal equipment;

and provide the first wireless data service to a second application on the terminal equipment via the first application on the wireless device using at least the second communication path. wherein the private IP address enables the wireless device to distinguish packets corresponding to the first wireless data service from general communication packets corresponding to the terminal equipment.

37. The processor readable media of claim 36, and further for storing instructions operable to:

forward outbound packets received from the terminal equipment with the single IP address as a source address to the wireless network, and forward inbound packets received from the wireless network with the single IP address as a destination address to the terminal equipment.

38. At least one processor, comprising:

a first processing unit operable to provide a first wireless data service via a first application on a wireless device;

a second processing unit operable to obtain a single IP address by the wireless device from a wireless network;

a third processing unit operable to assign the single IP address over to a terminal equipment to define a first interface on the terminal equipment with the wireless device;

a fourth processing unit operable to assign the single IP address to define a second interface on the wireless device with the wireless network;

a fifth processing unit operable to derive a private IP address for use by the wireless device to exchange packets with the terminal equipment;

a sixth processing unit operable to assign the private IP address to define a third interface on the wireless device with the terminal equipment;

a seventh processing unit operable to provide a first IP-based communication path between the terminal equipment and the wireless network via second interface and the third interface on the wireless device and using the single IP address;

an eighth processing unit operable to provide a second IP-based communication path between the wireless device and the terminal equipment comprising:

using the third interface and the first interface;

a ninth processing unit operable to provide a third IP-based communication path between the wireless device and the wireless network using the second interface and using the single IP address;

a tenth processing unit operable to implement the firsts, second and third IP-based communication paths for communications between the wireless device, the wireless network and the terminal equipment; and an eleventh processing unit operable to provide the first wireless data service to a second application on the terminal equipment via the first application on the wireless device using at least the second communication path, wherein the private IP address enables the wireless device to distinguish packets corresponding to the first wireless data service from general communication packets corresponding to the terminal equipment.

* * * * *